United States Patent Office 3,510,530
Patented May 5, 1970

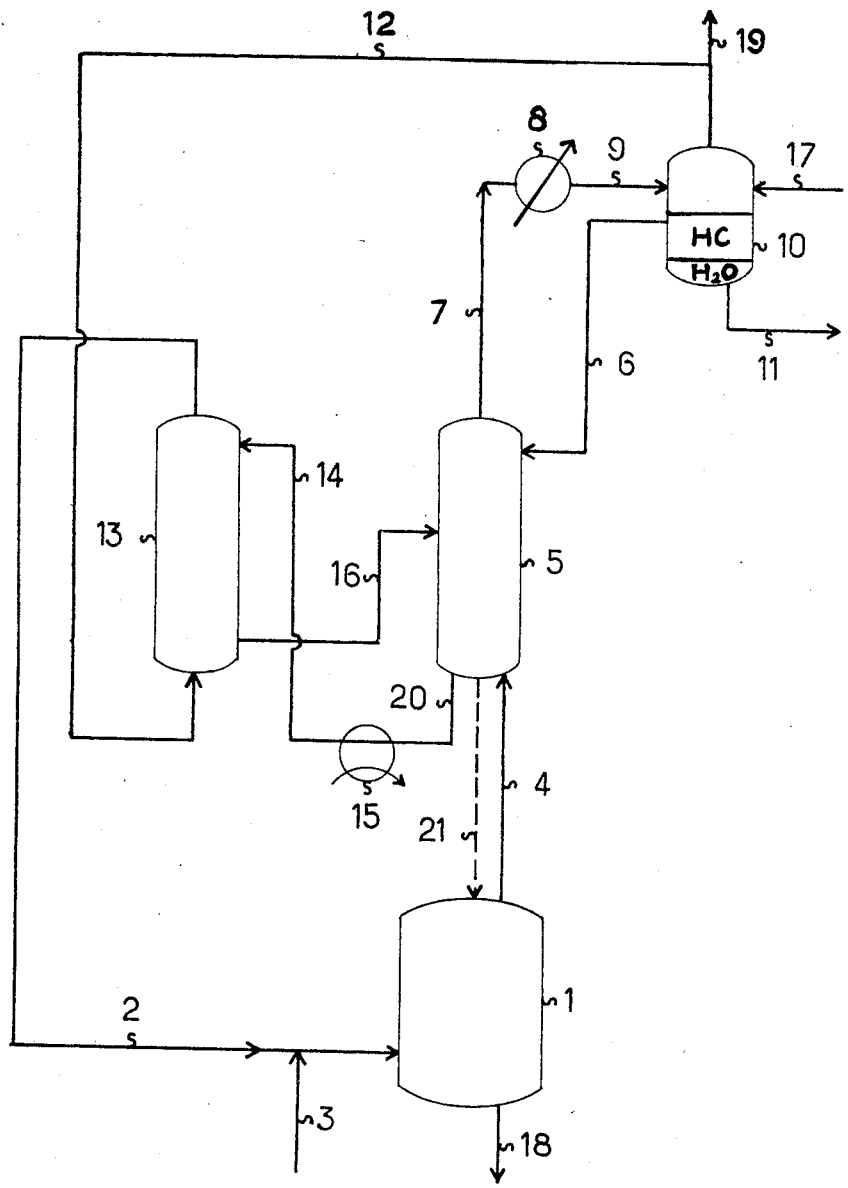

3,510,530
PROCESS FOR THE OXIDATION OF
HYDROCARBONS
Jacob Alagy, La Celle-Saint-Cloud, Franz Defoor, Rueil-Malmaison, and Sigismond Franckowiak, Montesson, France, assignors to Institut Francais du Pétrole des Carburants et Lubrifiants, Rueil-Malmaison, France
Filed Aug. 18, 1965, Ser. No. 480,688
Claims priority, application France, Aug. 18, 1964, 985,546
Int. Cl. C07c *35/08, 29/00;* C07b *29/00*
U.S. Cl. 260—631                                 16 Claims

ABSTRACT OF THE DISCLOSURE

In the oxidation of cyclohexane to cyclohexanol by the use of an oxygen-containing gas and a boron compound, the improvement of treating the "boil-up" by separating oxygen-depleted gas from condensed cyclohexane, heating at least a portion of the condensed cyclohexane to above the reaction temperature, intermixing the oxygen-depleted gas with the heated cyclohexane, and recycling the resultant mixture to the reaction vessel.

---

This invention relates to an improved process for the oxidation of hydrocarbons to the corresponding alcohols thereof.

The oxidation of saturated hydrocarbons, cyclic or acyclic, by means of molecular oxygen is of particular interest for the production of the corresponding alcohols thereof. However, for the reaction to be selective to the production of these alcohols, it is necessary to observe the following conditions:

(1) The employment of a boron compound, such as boric acid or a derivative thereof, in particular metaboric acid, boron anhydride or an alkyl borate, in order to protect the produced alcohol group so as to avoid any further oxidation.

(2) The employment of molecular oxygen in a very dilute form which in practice embodies the use of a nitrogen recycle stream in order to provide a molecular oxygen content of the oxidizing gas charged to the reactor of an average concentration of about 1–20 percent by volume.

(3) Conducting the oxidation reaction under a moderate superatmospheric pressure which approaches the boiling pressure of the hydrocarbon at the reaction temperature, such oxidation pressures being generally 5–20 atmospheres gauge.

Utilizing the preceding principles, a current mode of operation comprises passing the oxidizing gas (essentially nitrogen and oxygen) into a reactor containing a liquid hydrocarbon at an elevated temperature, generally 100–200° C., preferably 140–180° C. Effluent gas from the reactor is then cooled and condensed in order to separate a gaseous phase and a liquid phase. The gaseous phase consisting essentially of nitrogen, residual oxygen and uncondensed unreacted hydrocarbons is at least partly recycled to the reactor. The liquid phase, on the other hand, containing water and unreacted hydrocarbons is separated, for example by decantation, the water being removed and the liquid hydrocarbon being also recycled to the reactor, after being reheated by either direct or indirect heat exchange with said effluent gas.

The condenser employed to condense the effluent gas from the reactor is any conventional type, being cooled, for example, by either air or water. If the process is employed to oxidize cyclohexane in particular, it is useful for the condenser to be capable of lowering the temperature of the effluent gas to about 25–45° C.

Whereas the precedingly described process is satisfactory to a certain extent, a difficult problem is encountered in operating the process with respect to supplying the reactor with the necessary quantity of heat without creating local hot spots in the reaction media, such local overheating being deleterious to the production of high yields of products on the one hand and preventing the production of substantially colorless products on the other hand.

An object of this invention, therefore, is to provide an improved process, in particular, one wherein the reaction temperature is easier to control, thereby decreasing, if not eliminating, localized hot spots in the reactor. Upon further study of the specification and appended claims, other objects and advantages will become apparent.

The attached drawing is a schematic diagram of a preferred specific embodiment of the invention and will be discussed in more detail hereinafter.

To attain the objects of this invention, it has been unexpectedly discovered that a special thermal treatment of the effluent gas results in a highly improved process. Specifically, it is necessary to heat the liquid hydrocarbon obtained as a condensate from the effluent gas to a higher temperature than that of the reaction before mixing it with at least a portion of the effluent gas which is not condensed in the condenser, and then passing the resultant mixture to the reactor. In practice, the temperature to which the hydrocarbon stream is raised should preferably not exceed the reaction temperature by more than 50° C. More preferably, the hydrocarbon stream is raised to about 5–25° C. above the reaction temperature.

By virtue of the process of this invention, the mixture of recycle gas and hydrocarbon is introduced into the reactor at an elevated temperature, generally approaching the reaction temperature, i.e. preferably plus or minus 30° C. around the latter, and in a state wherein the gas is completely to nearly saturated with hydrocarbon, i.e. preferably 50 to 100% saturation. Under these conditions, the regulation and control of the reaction is facilitated, thereby resulting in a high yield of product which is substantially to completely colorless. As a further advantage, the process of the invention is benefitted with a high thermal efficiency.

It is a preferred feature of this invention, to subject to the aforementioned saturation and reheating treatment only that fraction of the gaseous feed which is recovered as recycle gas. In this way, owing to the low oxygen content of the recycle gas, there is a lower degree of hydrocarbon oxidation before the mixture reaches the reactor—a premature oxidation reaction being undesirable. The balance of the oxidizing gas can be added to the saturated and reheated mixture at a point close to the inlet conduit to the reactor, or alternatively, in a separate conduit directly into the reactor.

For a further illustration of the invention, reference is now made to the attached drawing which represents a preferred embodiment of this invention and, as such, should not be considered as limitative of the broad aspects of this invention as set forth in the appended claims.

The hydrocarbon to be oxidized contained in reactor 1 is subjected to treatment with oxidizing gas which enters the reactor through conduit 2. The latter conduit is used to conduct the warm recycled gas saturated in hydrocarbon to the reactor and also to permit the introduction of supplemental oxygen (e.g. fresh air) via branch conduit 3, this supplemental oxygen being previously preheated if desired. Effluent gas and vapors leave the reactor through conduit 4 and traverse heat exchanger 5 where their heat is transferred directly or indirectly across a heat exchange surface against liquid hydrocarbon coming from conduit 6.

By means of this just described heat exchange step, a portion of the vapor is condensed. The remaining gas and uncondensed vabors are then passed through conduit 7 to condenser 8 where they are cooled sufficiently to liquefy a substantial portion of the water and hydrocarbon vapor therein. The effluent from the condenser then passes through conduit 9 into decanter or phase separator 10 wherein the hydrocarbon phase is separated and recycled through conduit 6 to heat exchanger 5. The aqueous phase that is obtained in the decanter is removed through conduit 11. The gaseous phase depleted on oxygen is recycled through conduit 12 after optionally purging a portion of same through conduit 19. (A gas purge will be necessary to prevent a build up of nitrogen if air or the like is employed as the source of supplemental oxygen.)

When this process is employed for the oxidation of cyclohexane, a significant improvement is unexpectedly obtained in the alcohol yield if the uncondensed gas from condenser 8 is subjected to a supplemental cooling step in a cold condenser refrigerated for example by brine, so as to lower the temperature of the gas to below 20° C., preferably to 5–15° C. Temperatures even below the normal crystallization temberature of cyclohexane can be used, probably as a consequence of the presence of traces of oxidation products which lower the crystallization temperature.

The gas from conduit 12 is passed into exchanger 13 in direct contact with heated reflux hydrocarbon which is in the liquid or vapor state or a mixture thereof. This warm reflux hydrocarbon stream is obtained by withdrawing hydrocarbon from the exchanger 5, passing it through line 20, then to heat exchanger 15 where it is heated to the required temperature, and then passed via line 14 to heat exchanger 13. It is in this heat exchanger 15 that the necessary supplemental heat for the oxidation reaction is obtained, by heating the reflux hydrocarbon stream to a temperature higher than that of the oxidation reaction.

In the exchanger 13 at least a portion, preferably at least 60% of the hydrocarbon is vaporized and is conducted in this state into conduit 2, leading from the top of exchanger 13. It is here to be noted that a part (preferably not more than 40%) of the hydrocarbon can also be entrained in the liquid state in conduit 2 but this is less suitable.

If, in the operation of exchanger 13, there is an incomplete sweeping of the hydrocarbon into line 2, it is advantageous to recycle remaining liquid hydrocarbon through conduit 16 to heat exchanger 5. As a matter of fact, it is preferred to effect a substantial circulation of hydrocarbons through conduits 20, 14 and 16 inasmuch as it results in an unexpected improvement in not only the heat balance of the reaction but also in the molar yield of alcohol.

To obtain the maximum advantages of this process it is preferred to employ a weight ratio of the amount of liquid hydrocarbon in conduit 20 to the amount of vaporized hydrocarbon in conduit 4 of about 0.2:1 to 5:1 respectively. This ratio is particularly beneficial when cyclohexane is employed as the hydrocarbon.

The combination of exchangers 5, 13 and 15 is in effect a multiple stage exchanger in which, from an overall standpoint, the fluid in conduit 4 and the heating medium in exchanger 15 (for example superheated steam) supply the heat to the gas flowing in conduit 12. Intermediate heat transfer stages are accomlished by the flow of the hydrocarbon in conduits 20, 14 and 16, the latter being dependent on the operating conditions (i.e. whether residual hydrocarbon liquid remains in the exchanger 13).

Fresh hydrocarbon starting material can be conducted directly into the reactor, but it is preferable that provision be made so that it can be reheated before entering the reactor.

With respect to the latter preferred mode, it is convenient to utilize conduit 17 leading into decanter 10 for the introduction of fresh hydrocarbon; however, it can also be introduced into line 6 or into heat exchanger 5, thereby accomplishing the same purpose. The fresh hydrocarbon which is reheated can thus be brought into contact with recycled gas conjointly with unreacted hydrocarbon condensate. This results in a novel procedure and of more importance, a substantial improvement in yield of alcohol.

Although this invention is unique with respect to employing the hydrocarbon feed in the form of a vapor by passing it together with the recycled gas through conduit 2, a part of the reflux liquid hydrocarbon can also be recycled directly to reactor 1, for example, by means of conduit 21. In practice, it is preferred that at least 75% of the hydrocarbon is introduced to the reactor via conduit 2 and that the hydrocarbon is substantially if not completely in the vapor state. Thus, a maximum of 25% of the reflux liquid hydrocarbon is passed through conduit 21 back to the reactor. It is also to be mentioned that the flow in conduit 21 is advantageously regulated so as to control the liquid level in the reactor.

Referring now to condenser 8, it is for example of the air or water type. The temperature of the heat exchange medium is maintained for example at about 20–50° C., and in such a case the non-condensed gas reaches a temperature of about 30–60° C.

Here it is also to be noted that conduit 3 employed for passing make-up oxygen into the system can terminate directly in the reactor 1 instead of being admixed with the gas in line 2. Finally conduit 18 is employed to draw off the reaction product, and if the oxidation process is conducted in the presence of boric acid or a derivative thereof, it can be introduced into the reactor 1 by a conventional feed-line which is not shown on the drawing.

Whereas the preceding description taken in conjunction with the drawing describes a preferred, comprehensive embodiment of applicants' invention, it is to be pointed out that the critical aspect of this invention is the utilization of a direct-contact heat exchanger 13 wherein heated reflux hydrocarbon is mixed with oxygen-poor, recycled gas. The other aspects of the invention are still further improvements related to this fundamental concept.

Example 1

This example is presented for purpose of comparison to illustrate a system wherein exchangers 5 and 13 of the attached drawing are not employed. In such a system line 4 is directly connected to line 7; line 6 is directly connected to reheater 15; line 12 is directly connected to line 2; and lines 16 and 21 are not utilized. Line 14 is directly connected to vessel 1.

The oxidizing gas is introduced in a relatively cold state (about 30° C.) to the reactor. To compensate for the heat losses of the system and to supply the required heat for the reactor, a reheater 15 is employed as would be the case in an industrial installation based on this system.

Into the reactor 1 there is charged 600 moles of cyclohexane and 115 moles of metaboric acid. Through lines 12 and 2 there is established a recycle of 880 moles per hour of gas consisting essentially of nitrogen and traces of oxygen, said gas having a temperature of about 30° C.; the reactor is maintained at 160° C. and a pressure of 10 atmospheres. During a course of 2 hours there is introduced into the reactor 374 moles of a mixture of oxygen and nitrogen in the form of air. At the termination of the reaction, a highly colored liquid is withdrawn. The analysis of the liquid indicates that 66 moles of cyclohexane are consumed and converted to 49.5 moles of a mixture of cyclohexanol and cyclohexanone, corresponding to a molar yield of about 75%. In the reactor, there are found plates of boric acid around the inlet of conduit 6.

The molar ratio of cyclohexanol to cyclohexanone is 5. The heat furnished by reheater 15 amounts to 25,730 kcal./h., and is transmitted to cyclohexane of line 6 to reheat it to 180° C.

Example 2

This example illustrates for purposes of comparison a system wherein exchanger 5 is utilized, but exchanger 13 is not employed. Line 20 is then connected to reactor 1 through reheater 15. Conduits 12 and 2 are connected directly, and the oxidizing gases are then introduced to the reactor at a temperature of 25° C. Lines 14, 16 and 21 are not employed.

The process is conducted for a duration of 2 hours in the same manner corresponding to that of Example 1. The withdrawn product in this example is only slightly colored. An analysis of the product indicates that from 65 moles of cyclohexane, there are produced 50.1 moles of a mixture of cyclohexanol-cyclohexanone, corresponding to a molar yield of 77%. The reactor is found to contain plates of boric acid in the same manner as in Example 1. The molar ratio of cyclohexanol to cyclohexanone is 6.

The heat evolved by reheater 15 amounts to 19,800 kcal./h. and again is transmitted to the reactor by cyclohexane at a temperature of 180° C.

Example 3

This example illustrates the process of this invention, as specifically embodied in the attached drawing. Thus, the recycled gas is directly reheated in exchanger 13 by heated hydrocarbon, and the resultant mixture is thereupon fed to the reactor through line 2. In this example, the cyclohexane in line 2 is in the vapor state; reflux line 21 is not employed; and conduits 20 and 4 contain equal amounts by weight of cyclohexane. The process is then conducted in the same manner as in Example 1.

During the course of 2 hours, 69 moles of cyclohexane are consumed and result in 62.5 moles of a colorless mixture of cyclohexanol-cyclohexanone, the overall molar yield being 90.5%. The molar ratio of cyclohexanol to cyclohexanone is 9.

In this example, it is necessary for reheater 15 to utilize only 14,900 kcal./h. Whereas reheater 15 raises the temperature of cyclohexane in line 14 to 175° C., the temperature of the gaseous mixture withdrawn from exchanger 13 in line 2 does not exceed 166° C.

By a comparison of Examples 1 to 3, it is quite clear that the process of this invention is not only economic with respect to heating values, but of more importance there is realized substantial improvement in the yield and quality of the final product.

Example 4

Example 3 is repeated, but this time the recycled gas is cooled to a temperature of 6° C. before it is permitted to leave separator 10. By virtue of this modification, the molar ratio of cyclohexanol to cyclohexanone is increased to 10, and the overall molar yield is increased slightly to 91%.

The preceding examples can be repeated with similar success by substituting the generically and specifically described reactants and operating conditions of this invention for those used in the preceding examples.

From the foregong description, one skilled in the art can easily ascertain the essential characteristics of this invention, and without departing from the spirit and scope thereof, can make various changes and modifications of the invention to adapt it to various usages and conditions.

What is claimed is:

1. In a process for the oxidation of cyclohexane to cyclohexanol which comprises passing a gas contaniing nitrogen and molecular oxygen in a volumetric concentration of about 1–20% into a reaction zone having a reaction temperature between 100 and 200° C., a pressure of about 5–20 atmospheres, and containing liquid cyclohexane, and a boric acid compound, removing from said reaction zone an effluent stream containing oxygen-depleted gas, water vapor and unreacted vapor phase cyclohexane, cooling said stream to condense said vapor phase cyclohexane and said water vapor, separating the cooled oxygen-depleted gas from the resultant condensed cyclohexane and condensed water, and separating the condensed cyclohexane from the condensed water, the improvement comprising heating at least a portion of the condensed and separated cyclohexane to a temperature in excess of said reaction temperature, directly mixing the resultant heated portion of cyclohexane with the separated cooled oxygen-depleted gas to reheat the latter and enrich said latter with cyclohexane vapor, and recycling the resultant reheated and enriched gaseous mixture to said reaction zone.

2. A process as defined in claim 1 further comprising the step of adding fresh cyclohexane to the condensed unreacted cyclohexane before the latter is mixed with said separated oxygen-depleted gas.

3. A process as defined in claim 1 further comprising the step of passing the condensed unreacted cyclohexane in heat exchange relationship with said effluent stream before said condensed unreacted cyclohexane is mixed with said separated oxygen-depleted gas.

4. A process as defined by claim 1 wherein the oxygen-depleted gas is cooled to less than 60° C. during the condensation of the cyclohexane vapor and water vapor before being mixed with the heated condensed unreacted cyclohexane.

5. A process as defined in claim 4, wherein the reaction temperature is 140–180° C.

6. A process as defined by claim 4 further comprising cooling said oxygen-depleted gas to less than 20° C. in a supplementary cooling step before being mixed with said heated unreacted cyclohexane, whereby an increased yield in alcohol is obtained.

7. A process as defined by claim 6 wherein said oxygen-depleted gas is cooled to 5–15° C.

8. A process as defined by claim 4 wherein the condensed unreacted cyclohexane is heated to not more than 50° C. above said reaction temperature.

9. A process as defined by claim 4 wherein the condensed unreacted cyclohexane is heated to 5–25° C. above said reaction temperature.

10. A process as defined in claim 1 wherein said oxygen-depleted gas is cooled to 30–60° C. before being mixed with the heated condensed unreacted cyclohexane.

11. A process as defined by claim 1 wherein the condensed unreacted cyclohexane is heated to not more than 50° C. above said reaction temperature.

12. A process as defined by claim 2 wherein the condensed unreacted cyclohexane is heated to not more than 50° C. above said reaction temperature.

13. A process as defined by claim 1 wherein the condensed unreacted cyclohexane is heated to 5–25° C. above said reaction temperature.

14. A process as defined by claim 2 wherein the condensed unreacted cyclohexane is heated to 5–25° C. above said reaction temperature.

15. A process as defined in claim 1, wherein the cooled oxygen-depleted gas is reheated by means of said heated cyclohexane to a temperature in the range of 30° C. above to 30° C. below the reaction temperature, and enriched with cyclohexane vapor to an extent between 50 and 100% with respect to saturation.

16. A process as defined by claim 1 wherein said resultant heated portion of cyclohexane is in the liquid phase prior to said mixing.

References Cited

UNITED STATES PATENTS

| | | | |
|---|---|---|---|
| 3,317,614 | 5/1967 | Marcell | 260—618 |
| 2,938,924 | 5/1960 | Simon et al. | |
| 3,324,186 | 6/1967 | Olenberg. | |

FOREIGN PATENTS 1,158,963 12/1963 Germany.

OTHER REFERENCES

Bashkirov et al.; Khim. Nauk. i Prom., vol. 4 pp. 607–12 (1959).

LEON ZITVER, Primary Examiner

M. W. GLYNN, Assistant Examiner

U.S. Cl. X.R.

260—586